United States Patent [19]

Burford et al.

[11] Patent Number: 4,978,408
[45] Date of Patent: Dec. 18, 1990

[54] METHOD FOR HEAT SEALING THERMOPLASTIC ARTICLES

[75] Inventors: Russell L. Burford, St. Louis Park; Raymond K. Newkirk, Mound, both of Minn.

[73] Assignee: Forward Technology Industries, Inc., Minneapolis, Minn.

[21] Appl. No.: 51,914

[22] Filed: May 20, 1987

Related U.S. Application Data

[63] Continuation of Ser. No. 794,472, Nov. 4, 1985, abandoned.

[51] Int. Cl.$^5$ .............................................. B32B 31/20
[52] U.S. Cl. ................................ 156/281; 150/304.1; 150/308.2; 150/309.9; 150/322
[58] Field of Search .................... 156/228, 272.2, 297, 156/281, 299, 308.2, 304.1, 308.4, 309.6, 309.9, 320, 322, 584; 264/39; 15/210, 93 R

[56] References Cited

U.S. PATENT DOCUMENTS

| | | | |
|---|---|---|---|
| 1,529,691 | 3/1925 | Davis | 15/21 D |
| 1,964,174 | 6/1934 | Raiche | 15/21 D |
| 3,897,296 | 7/1975 | Waldrum | 156/309.6 |
| 4,297,778 | 11/1981 | Rumberger | 156/584 |

OTHER PUBLICATIONS

Richardson, "Nylon", *Modern Plastics* Enc., pp. 36, 41-42, 1977-1978.

*Primary Examiner*—Merrell C. Cashion, Jr.
*Attorney, Agent, or Firm*—Orrin M. Haugen; Thomas J. Nikolai; Frederick W. Niebuhr

[57] ABSTRACT

A method for fusion bonding a pair of articles consisting of a high melting point thermoplastic material which includes the steps of bringing each surface to be bonded into engagement with the contact surface portion of a heated platen, maintaining the engagement until the surface becomes fused, and thereafter bringing the fused surfaces together in face-to-face relationship until the fused surfaces become solidified. The method further includes the step, in each operative cycle, of abrading the contact surfaces of the platen to renew and expose the metallic surface thereof for engagement with the surface of the next thermoplastic article to be treated.

8 Claims, 1 Drawing Sheet

METHOD FOR HEAT SEALING THERMOPLASTIC ARTICLES

This is a continuation of application Ser. No. 06/794,472, filed Nov. 4, 1985 now abandoned.

BACKGROUND OF THE INVENTION

The present invention relates generally to an improved method for fusion bonding a pair of thermoplastic articles, which includes the conventional steps of bringing each surface to be bonded into physical engagement and contact with the surface portion of a heated platen, and thereafter maintaining such engagement until the surfaces of the thermoplastic articles become fused. Upon reaching fusion in the areas to be bonded, the articles are transferred into face-to-face relationship until the fused surfaces become solidified. In addition to these steps in the operation, the additional step is added which includes abrading the contact surfaces of the platen to renew and expose the metallic surface thereof for engagement with the surface of the next thermoplastic article to be treated.

Fusion bonding of certain low and medium melting point thermoplastic articles has been undertaken in the past, and is presently widely utilized for the formation of certain articles consisting of thermoplastic materials. Such methods have been successfully utilized in connection with relatively low melting thermoplastic materials such as polyethylene, polypropylene, polystyrene, and the like. With certain higher melting thermoplastic materials such as nylon, specifically crystalline nylon, fluorinated hydrocarbons such as Halar, are not considered as candidates for fusion bonding, particularly when contact with a heated platen is considered. Non-contact heating may be undertaken, but this procedure requires exceptionally long cycle times and is generally regarded as being unsatisfactory for production of most articles fabricated of such materials. It has been found, in accordance with the present invention, that fusion bonding of high melting point thermoplastic articles including nylon and florinated hydrocarbons is possible utilizing contact heating, with the present invention including the additional step of abrading the contact surfaces of the platen to renew and expose the metallic surfaces thereof prior to engagement with the surface of each thermoplastic article being treated. The abrading operation is conveniently accomplished by exposing the surfaces of the platen to wire bristle brushes, and preferably rotating wire brushes of cylindrical configuration during a portion of an operating cycle.

SUMMARY OF THE INVENTION

Briefly, in accordance with the present invention, the surfaces of the relatively high melting point thermoplastic articles to be bonded are brought into engagement with the contact surface portions of a heated platen. Engagement with the contact surfaces is maintained until the pertinent thermoplastic surfaces become fused. Thereafter, the heated platen is removed, and the thermoplastic articles are rapidly transferred into surface-to-surface contact and maintained in such contact until the fused surfaces become substantially solidified. The transfer motion bringing the fused surfaces into mutual contact is undertaken in a short period of time, such as in a period of less than about two seconds. In each operational cycle, the surfaces of the heated platen are abraded in order to renew the surface and expose the fresh metal thereof for engagement with the surface of the next thermoplastic article to be treated.

Therefore, it is a primary object of the present invention to provide an improved method for the fusion bonding of articles consisting of relatively high melting point thermoplastic materials, such as nylon and fluorinated hydrocarbons.

It is yet a further object to the present invention to provide an improved method for the fusion bonding of relatively high melting point thermoplastic articles, and wherein the method includes engaging the articles to be bonded with the contact surface portion of a heated platen, and thereafter bringing the fused surfaces into face-to-face relationship, and wherein the contact surfaces of the platen are abraded so as to renew the metallic surfaces thereof for engagement with the surface of each of the thermoplastic articles to be treated.

Other and further objects of the present invention will become apparent to those skilled in the art upon a study of the following specification, appended claims, and accompanying drawing.

IN THE DRAWING

FIG. 1 is a schematic diagram illustrating the steps undertaken in the method of the present invention; and FIG. 2 is a perspective view of a typical assembly utilized for accomplishing the various operations in the method of the present invention.

DESCRIPTION OF THE PREFERRED EMBODIMENT

Figure 1:
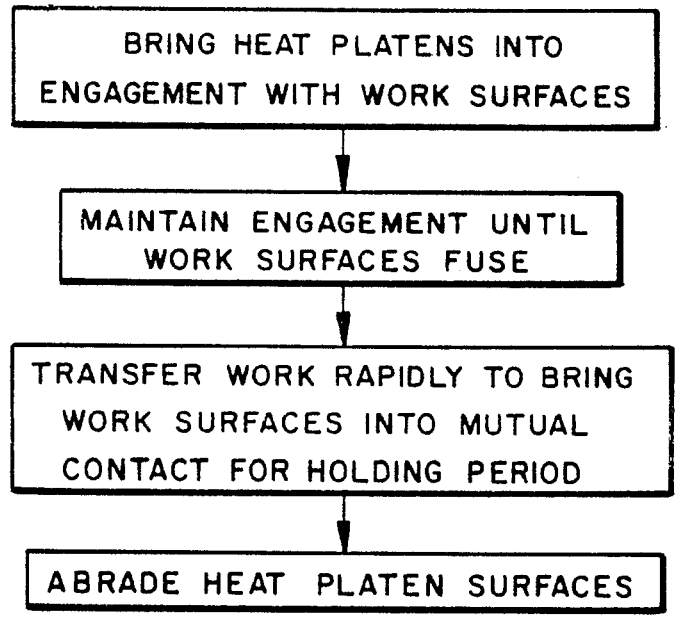

In accordance with the preferred embodiment of the present invention, a method has been developed for fusion bonding of two or more articles composed of a relatively high melting point thermoplastic, such as, for example, crystalline nylon. The configuration of the articles to be bonded will, of course, be any of a wide variety of configurations having surface portions thereof adapted to be mated together, and accordingly bonded in the sequence of individual operations set forth hereinbelow.

Nylon, including nylons characterized as "crystalline nylons" are widely used in industry. Nylons such as Nylon 6, Nylon 66, Nylon 9, and other materials are all commercially available, and may be characterized as being widely commercially available. Nylon is a linear polymer obtained by polymerization of epsilon-caprolactam, or, alternatively, through the condensation of hexamethylene diamine with adipic acid.

The physical properties of nylons, in particular Nylon 6 (polymerized e-caprolactam) are properly characterized as having a relatively high melting point. Nylon 6 softens at approximately 380° F., and melts at a temperature of about 400° F. Other conventionally available nylons have softening points and melting points which may be somewhat higher than those of Nylon 6.

Fluorinated hydrocarbons such as Halar, have considerably higher softening points and melting points, with that certain fluorinated hydrocarbon sold under the mark Halar of Allied Chemical Co. of New York, N.Y., having a melting point in excess of about 500° F. and continue to exhibit certain thermoplastic characteristics at that temperature. In addition to these materials, certain polyesters which retain thermoplastic characteristics at elevated temperatures, as well as articles fabricated from phenylene oxide may be satisfactorily treated in accordance with the features of the present invention to achieve fusion bonding.

TREATMENT OF NYLON

In the initial step or operation in the method, nylon thermoplastic work articles are brought into contact with the heated renewed and fresh metallic surface of the platen. For most operations, a platen temperature of approximately 680° F. is maintained, although temperatures ranging from 650° to 1000° F. may be utilized. Contact is maintained between the platen surface and the work surfaces until the surfaces of the nylon article become fused. This contact time is typically about 5 seconds in duration, although, depending upon the geometry and thickness of the article being treated, a period of from about 2 seconds to 15 seconds may be appropriately utilized.

Following engagement between the platen surface and the work surface, the work articles are rapidly transferred or moved until the relevant surfaces are held in mutual contact, one against another for the duration of a holding period. The holding period is typically undertaken for that length of time required for the molten zones to become solidified. A time of from 5 seconds to 30 seconds is normally sufficient, it being appreciated that the articles must be maintained in contact for at least that period of time necessary for solidification to occur.

The heat capacity of nylon, as well as the heat of fusion, are relatively high, thereby contributing to the time period necessary for contact holding. Either simultaneously with the holding operation, or immediately thereafter, the heated platen surfaces are abraded with wire brushes in order to renew and expose the metallic surfaces of the platen for engagement with the surface of the next thermoplastic article to be treated. Typically, wire brushes having diameters of approximately four inches may be employed, with the brushes typically being of relatively fine but durable texture so as to remove any charred resin residue, and also renew and expose the fresh metallic surface for engagement with the next article to be treated.

Figure 2:
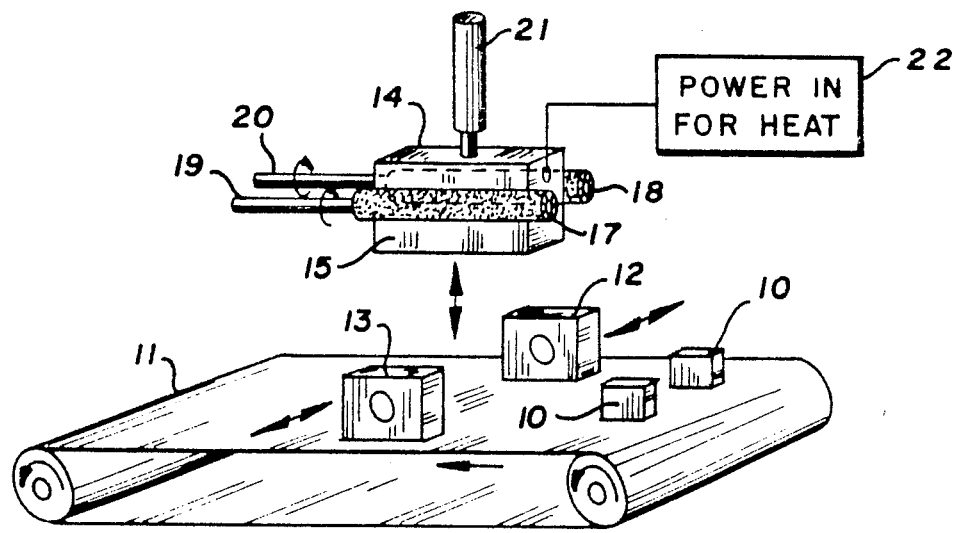

Turning now to FIG. 2 of the drawing, the work articles to be bonded, are preferably disposed on and along the surface of a holding or supporting table, such as the work articles generally designated 10—10, shown supported on the surface of upper conveyor flight 11. Pressure platens are illustrated at 12 and 13, with an electrically heated platen being shown at 14. The contact surfaces of the platen are typically illustrated as at 15. A pair of rotating wire brushes are provided as at 17 and 18, with the brushes being rotated or driven by rotating shafts 19 and 20, from a suitable motor or other source, not shown. Vertical reciprocatory motion of the platen is provided by reciprocating shaft 21, with shaft 21 being reciprocated by a suitable source of motion or power, such as a solenoid, cam follower, or the like. Electrical power for the platen is provided as at 22, with the thermal energy being obtained through resistance heaters, or other suitable means to achieve the platen surface temperatures desired.

In a typical operation, the work articles 10—10 are introduced into the working zone between the pressure platens 12 and 13, and the heated platen is interposed between the individual work articles 10—10. After a suitable time of engagement between the surfaces of the work articles 10—10, and the platen surface such as platen surface 15, platen 14 is retracted by virtue of stroking mechanism or shaft 21, at which time pressure platens 12 and 13 are caused to move transversely of conveyor 11 and thereby bringing the work articles 10—10 into mutual surface-to-surface contact with each other. In certain instances, it may be advantageous to permit the pressure platens to remain stationary, and instead of moving the platens, the work articles as well as the brush assemblies may be moved as appropriate to achieve the various operations of the total cycle.

It will be appreciated that the geometry of the thermoplastic articles being bonded will determine the design of the pressure platens, as well as the design of the heat platen. The general nature of the articles will also be considered in the manner of providing a work supporting surface. For most articles, and for high speed operation, a conveyor mechanism may be employed. Also, for purposes of cleanliness and environmental protection, an enclosure or cage may be suitably employed about the area so as to confine the operation as well as limit the extent to which any debris may be moved.

What is claimed is:

1. In a method for fusion bonding at least two articles composed of high melting point thermoplastic including the steps of bringing a fusable surface portion of each article to be bonded into engagement with a contact surface portion of a heated platen until each said fusable surface portion is fused, and thereafter bringing the fused surfaces together in face-to-face relationship, said method being characterized in that:
   (a) each said contact surface portion of said platen is heated to a temperature substantially greater than the fusion temperature of the thermoplastic article and in the range of from 650° F. to 1000° F.;
   (b) said fusable surface portions are simultaneously held in engagement with the contact surface portions until the fusable surface portions become fused;
   (c) the fusable surface portions, once fused, are rapidly transferred into surface-to-surface contact with each other, and maintained in surface-to-surface contact until the fused surface portions become substantially solifified; and
   (d) the contact surface portions of the heating platen are abraded to renew and expose said contact surfaces for engagement with fusable surface portions of each of a subsequent plurality of thermoplastic articles to be treated.

2. The method as defined in claim 1 being particularly characterized in that said abrading operation is undertaken with at least one wire bristle brush.

3. The method as defined in claim 1 being particularly characterized in that said thermoplastic articles are selected from the group consisting of nylon and fluorinated hydrocarbons.

4. The method as defined in claim 1 being particularly characterized in that the transfer time for articles with fused surfaces between the point of contact with the platen and the point of contact with each other is less than about two seconds.

5. The method as defined in claim 1 being particularly characterized in that said thermoplastic articles are nylon reinforced with glass fibers.

6. The method as defined in claim 5 being particularly characterized in that said glass fiber reinforcement comprises from between 10% and 33% of each nylon-glass reinforcement article.

7. The method as defined in claim 1 being particularly characterized in that the time of engagement between the heated platen and the thermoplastic articles is about fifteen seconds.

8. The method as defined in claim 1 being particularly characterized in that the surface temperature of the heated platen is approximately 300° F. greater than the melting point of the thermoplastic.

* * * * *

UNITED STATES PATENT AND TRADEMARK OFFICE
CERTIFICATE OF CORRECTION

PATENT NO. : 4,978,408

DATED : December 18, 1990

INVENTOR(S) : Russell L. Burford and Raymond K. Newkirk

It is certified that error appears in the above-identified patent and that said Letters Patent is hereby corrected as shown below:

Column 4, line 44, "solifified" should read -- solidified --.

Signed and Sealed this

Nineteenth Day of May, 1992

Attest:

DOUGLAS B. COMER

*Attesting Officer*      *Acting Commissioner of Patents and Trademarks*